US012703578B2

(12) United States Patent
Arimatsu et al.

(10) Patent No.: US 12,703,578 B2
(45) Date of Patent: Aug. 11, 2026

(54) ARTICLE-TRANSFER APPARATUS

(71) Applicant: ISHIDA CO., LTD., Kyoto (JP)

(72) Inventors: Tatsuya Arimatsu, Ritto (JP); Masaaki Hojo, Ritto (JP); Masashi Takeoka, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 109 days.

(21) Appl. No.: 18/732,493

(22) Filed: Jun. 3, 2024

(65) Prior Publication Data

US 2025/0002264 A1 Jan. 2, 2025

(30) Foreign Application Priority Data

Jun. 30, 2023 (JP) ................................ 2023-108274

(51) Int. Cl.
*B65G 47/31* (2006.01)

(52) U.S. Cl.
CPC ...... *B65G 47/31* (2013.01); *B65G 2203/0225* (2013.01); *B65G 2203/0241* (2013.01); *B65G 2203/041* (2013.01)

(58) Field of Classification Search
CPC ............ B65G 47/31; B65G 2203/0225; B65G 2203/0241; B65G 2203/041
USPC ........................................................ 198/463.1
See application file for complete search history.

(56) References Cited

U.S. PATENT DOCUMENTS 2,417,878 A * 3/1947 Luzietti ..................... B07B 4/08 209/914
3,934,702 A * 1/1976 Snyder .................. B65G 47/90 503/212
4,172,535 A * 10/1979 Smith .................... B65G 53/60 200/81.9 R
7,946,429 B2 * 5/2011 Kennedy .................. B07C 5/38 198/456
9,771,222 B2 * 9/2017 Schroader .............. B65G 43/10
10,875,724 B2 * 12/2020 Aschpurwis ........... B65G 43/08
2013/0110280 A1 * 5/2013 Folk ....................... B25J 9/0093 700/215
2015/0321843 A1 * 11/2015 Forestier ................ B65G 53/66 406/30

(Continued)

FOREIGN PATENT DOCUMENTS

CN 112978214 A 6/2021
DE 102007028680 A1 12/2008

(Continued)

OTHER PUBLICATIONS

CA3043018 (Year: 2018).*

(Continued)

*Primary Examiner* — Gene O Crawford
*Assistant Examiner* — Lester Rushin, III
(74) *Attorney, Agent, or Firm* — United IP Counselors, LLC

(57) ABSTRACT

With an article-transfer apparatus as disclosed herein, aligning articles is not hindered even when supply intervals of the articles change. Specifically, in cases where time intervals of bags supplied from upstream to an article-introduction conveyor become short and a control unit judges that the bags will not be able to be aligned (e.g., for packaging) even if they reach an alignment conveyor, an air nozzle of an article-sorting unit sorts the bags off the article-introduction conveyor.

9 Claims, 10 Drawing Sheets

(56) References Cited

U.S. PATENT DOCUMENTS

2022/0314282 A1* 10/2022 Mongrenier et al. ........................ B07C 5/3412
2023/0150772 A1* 5/2023 Heimberg ............. B65G 47/88 198/459.1

FOREIGN PATENT DOCUMENTS

DE 102021129997 A1 5/2023
JP 2018154468 A 10/2018

OTHER PUBLICATIONS

CA3093312 (Year: 2019).*
JP2022059301 (Year: 2022).*
DE102021129997 (Year: 2023).*
CN202203428 (Year: 2022).*
JP2018154468 (Year: 2018).*
ES 2534423 (Year: 2013).*
Extended European Search Report mailed on Oct. 29, 2024 in a corresponding European Patent Application No. 24180015.0-1017.

* cited by examiner

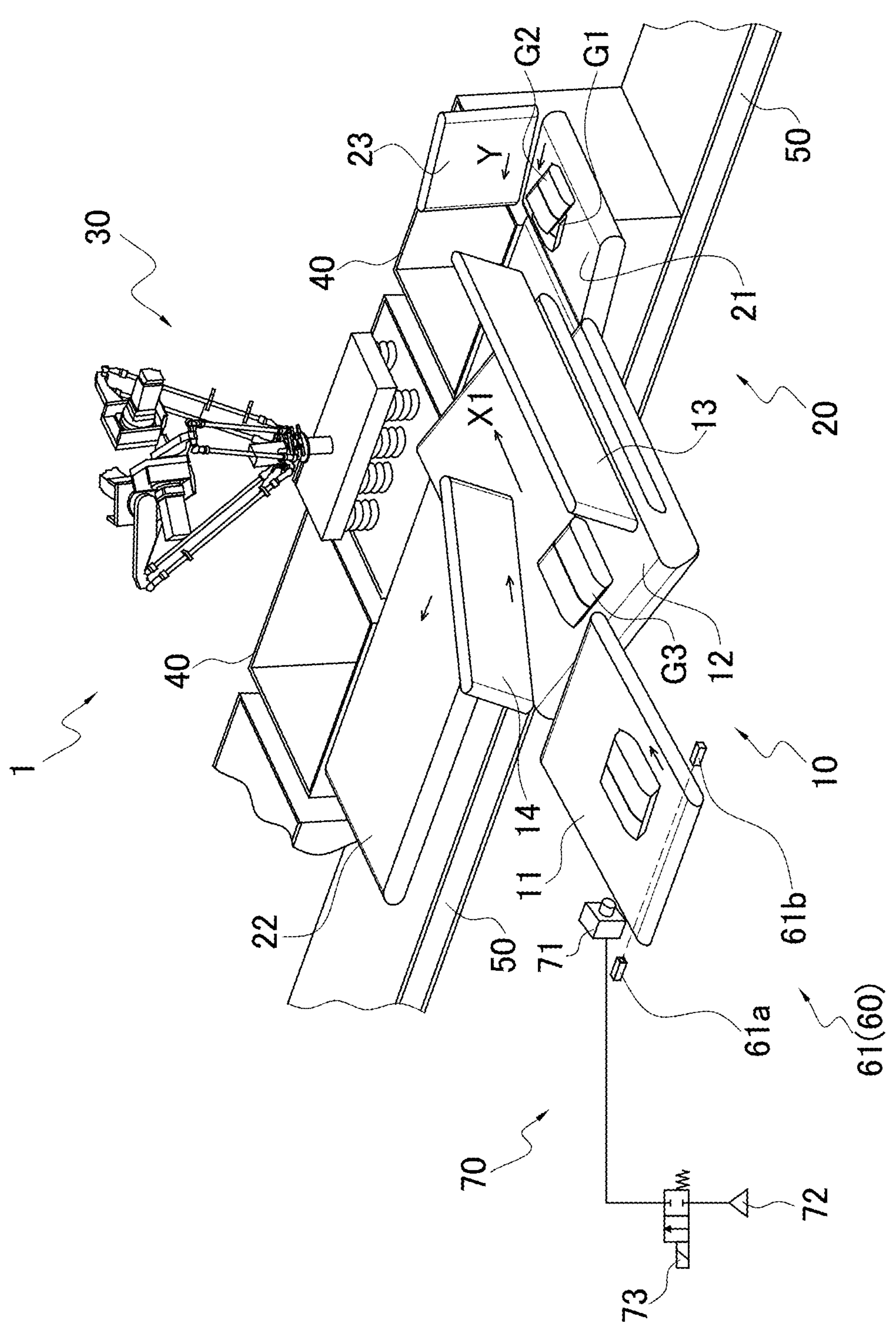
F I G. 1

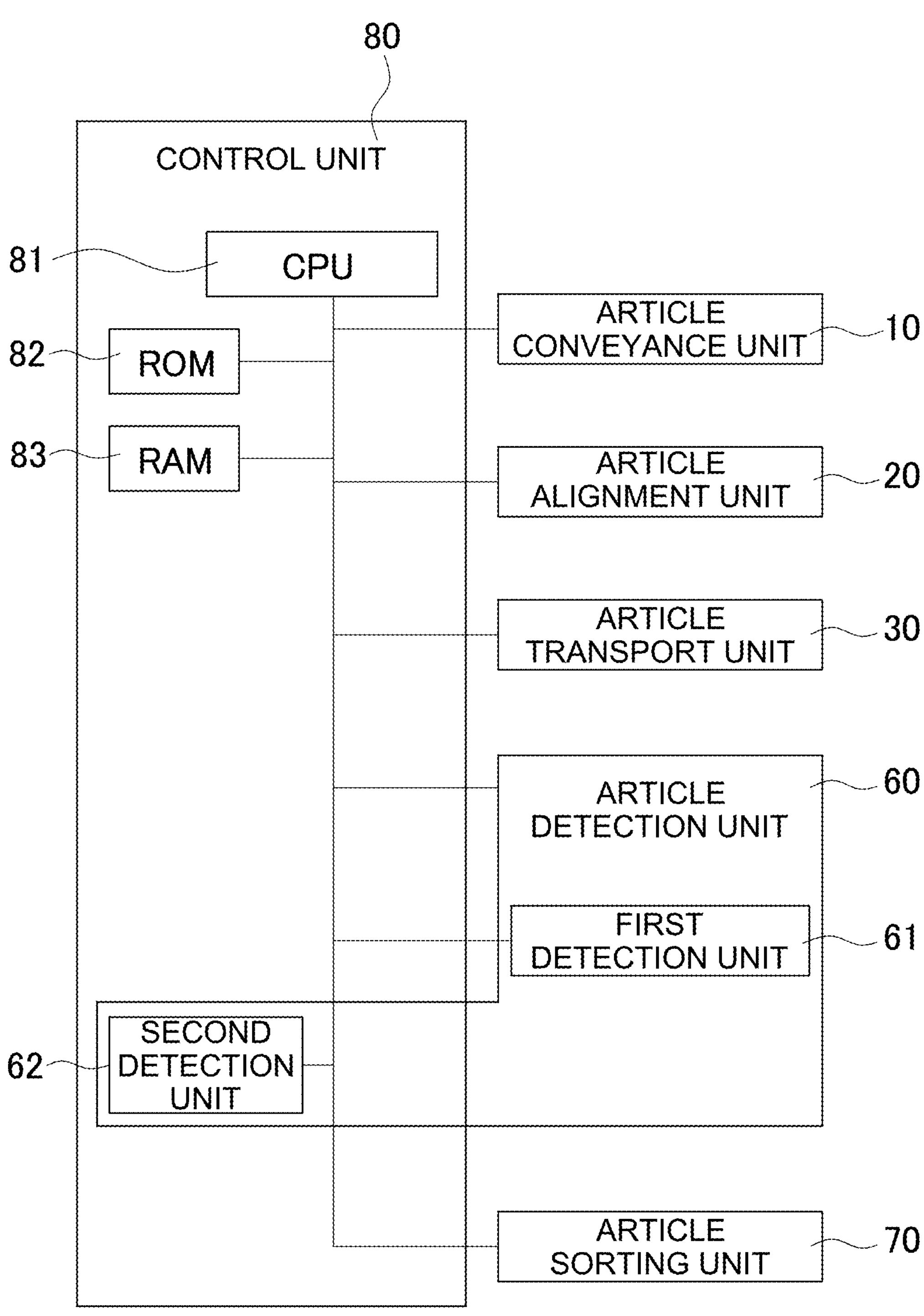
F I G. 2

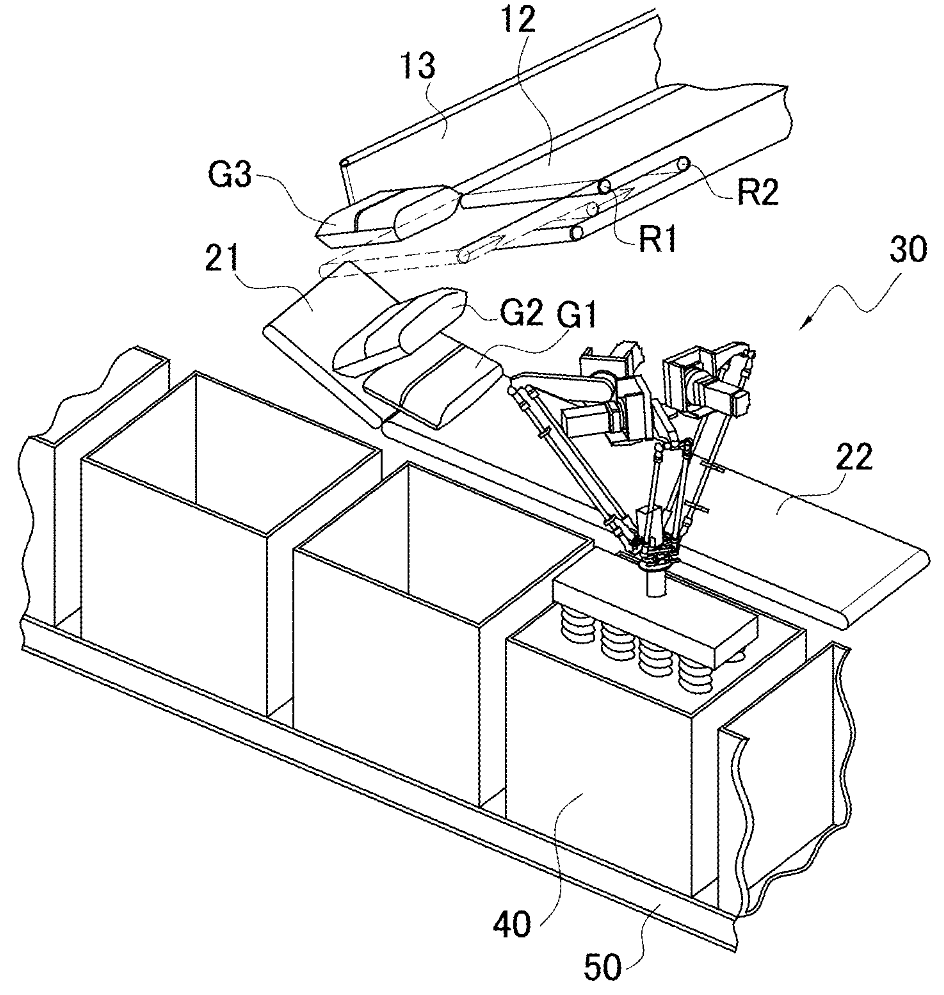
F I G. 3

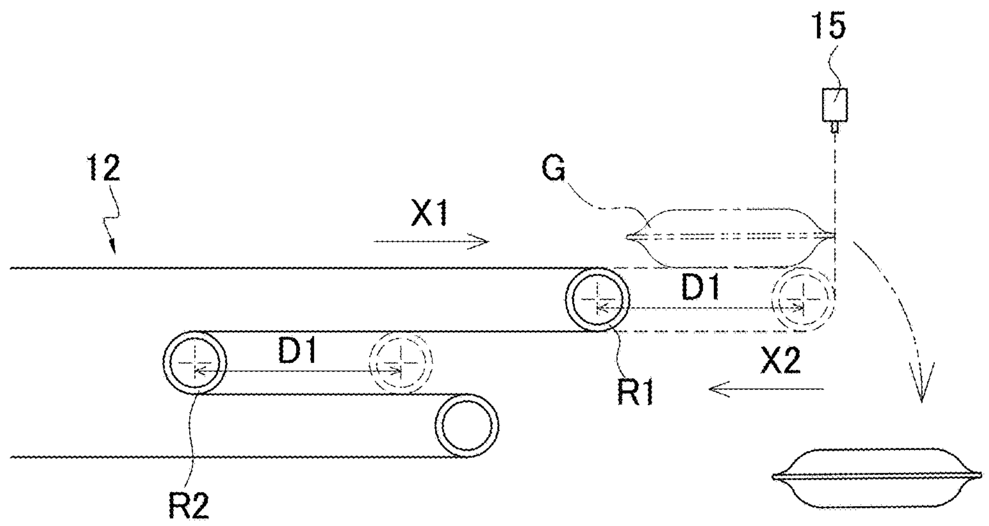
F I G. 4
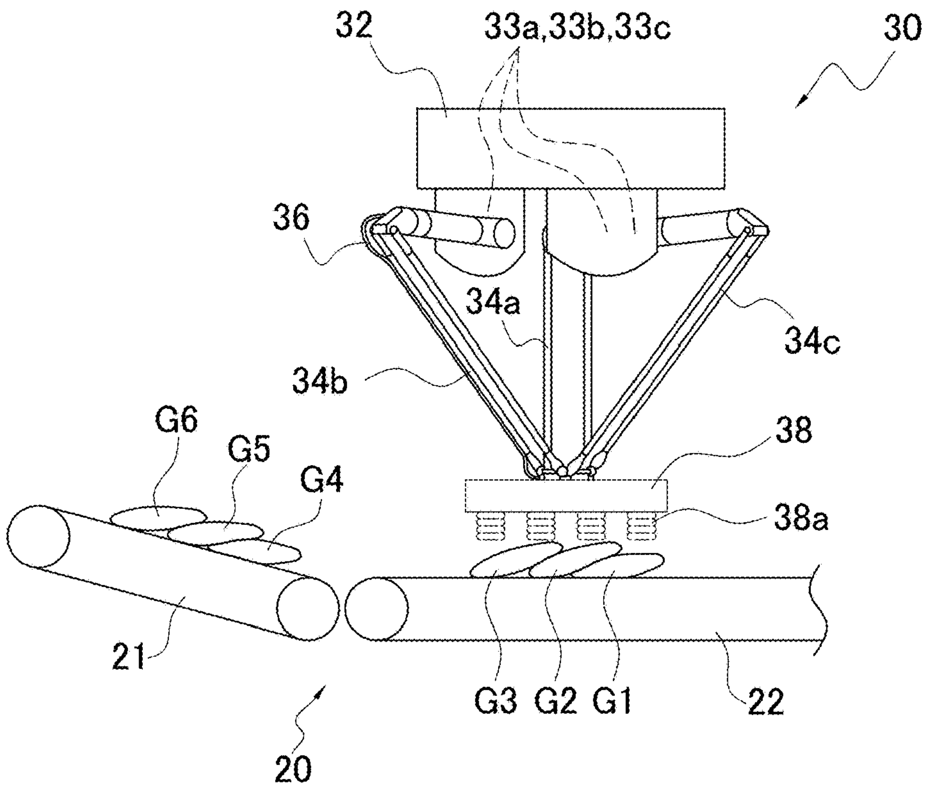
F I G. 5

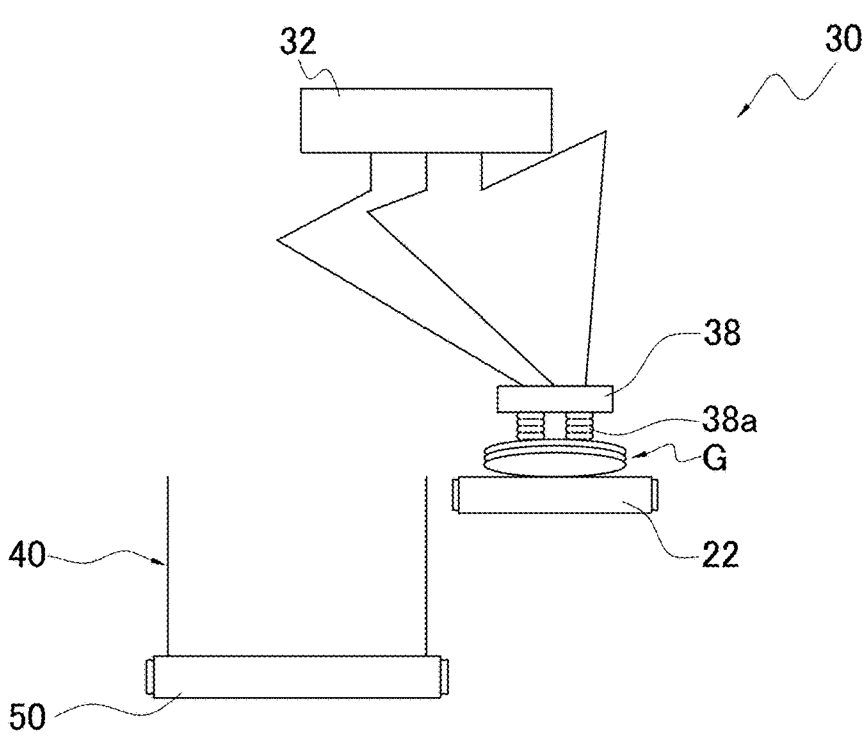
F I G. 6A
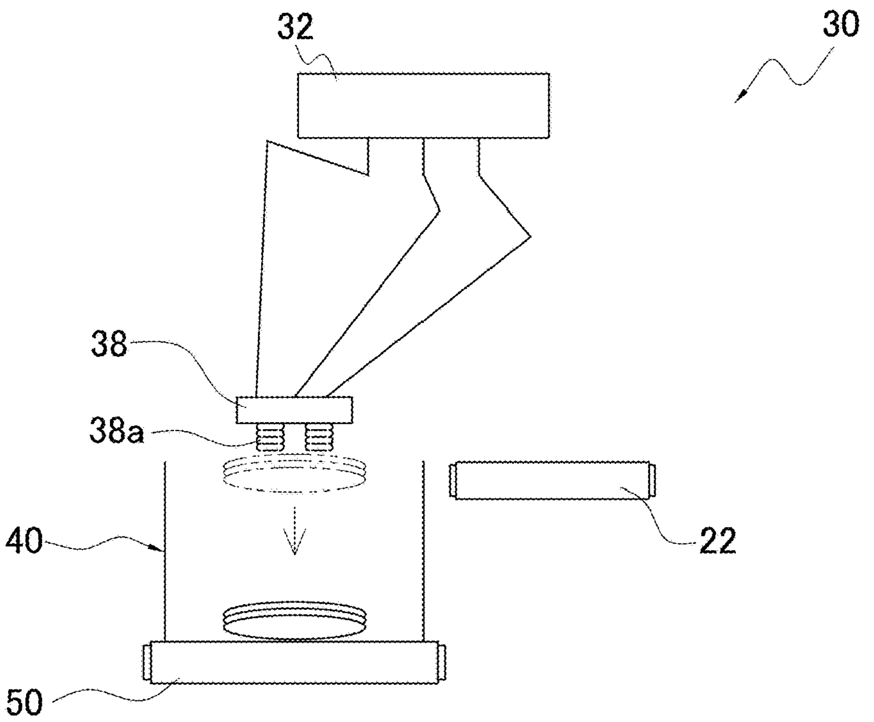
F I G. 6B

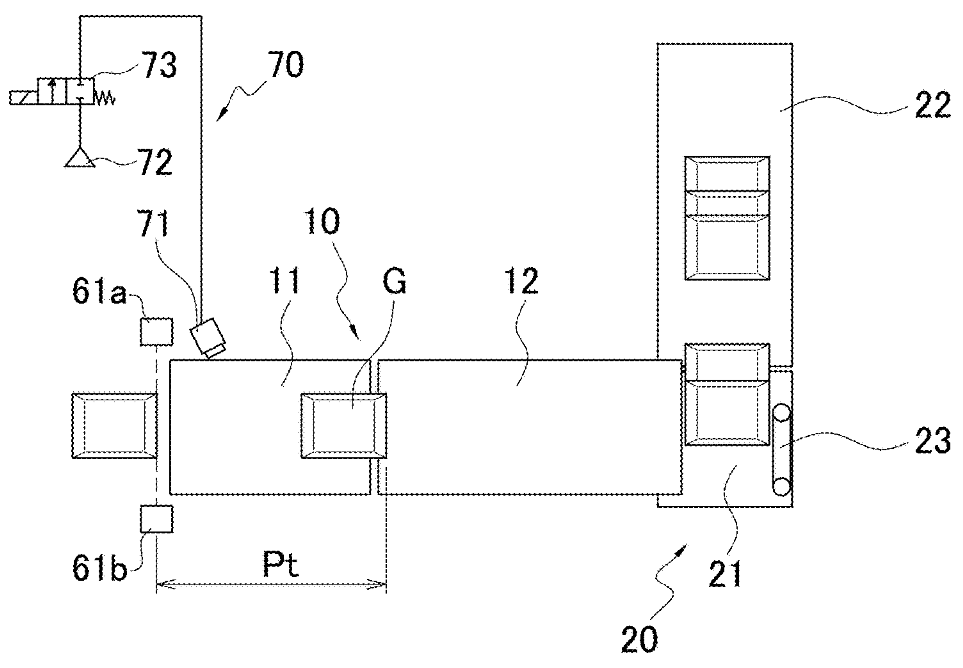
F I G. 7
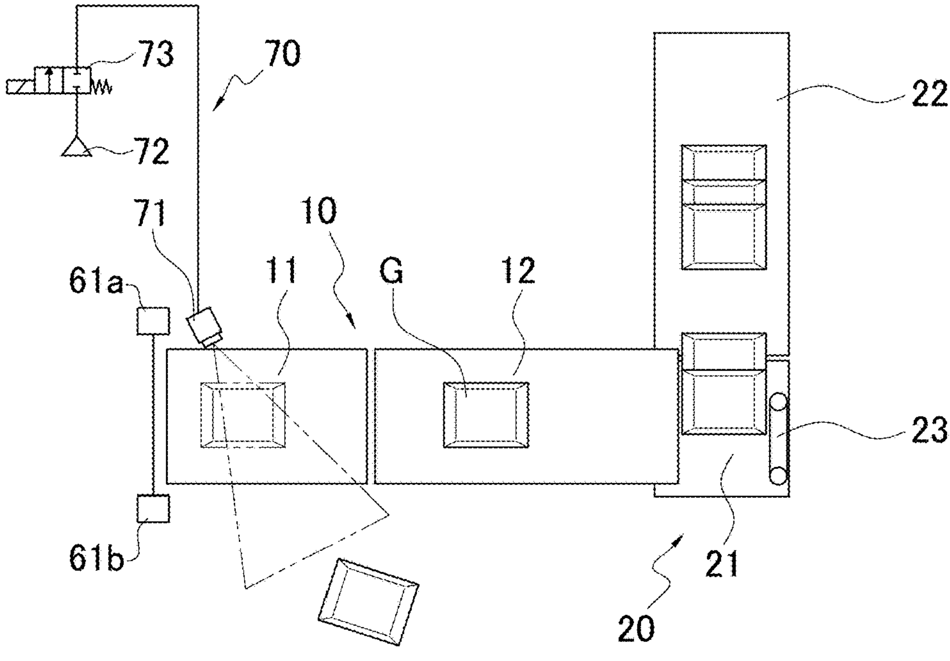
F I G. 8

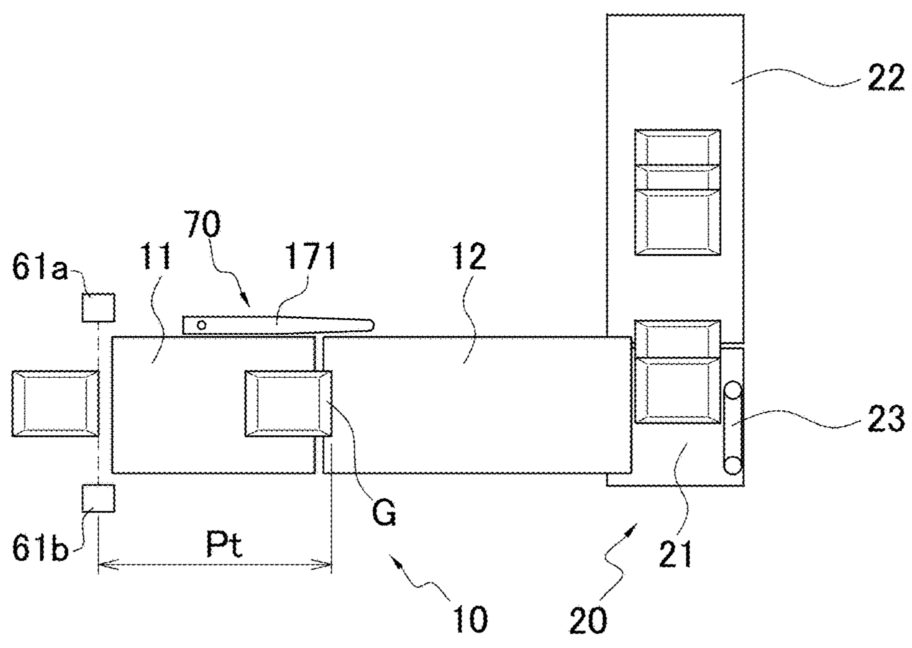
F I G. 12
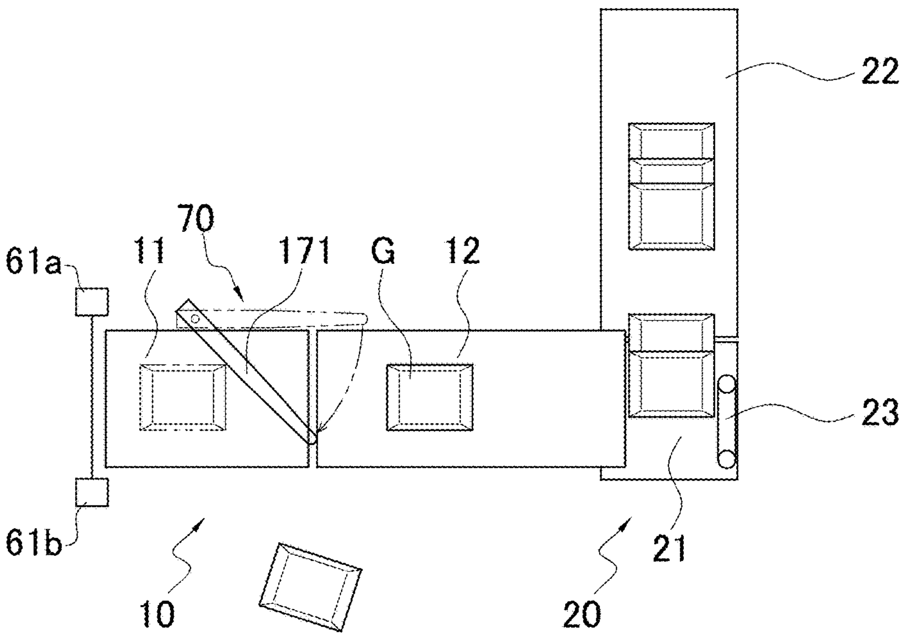
F I G. 13

ARTICLE-TRANSFER APPARATUS

TECHNICAL FIELD

The present disclosure relates to an article-transfer apparatus.

BACKGROUND

In recent years, article-transfer apparatus that group together a plurality of articles and transport them to a predetermined position have become widespread. For example, JP-A No. 2018-154468 discloses an apparatus where articles conveyed thereto in a first direction by a first conveyor are aligned on a second conveyor, form an article group, and are conveyed in a second direction.

In apparatus such as described above, it is necessary to perform an operation of aligning the articles on the second conveyor, and if the intervals between the articles conveyed by the first conveyed become narrow, there is the risk that there will not be enough time for the second conveyor to process the articles and that the alignment operation will be hindered, thus disturbing the orientation of the article group.

Therefore, an article-transfer apparatus is desired in which the operation of aligning the articles is not hindered even when the supply intervals of the articles change.

SUMMARY

An article-transfer apparatus of a first aspect includes a conveyance unit, an alignment unit, a sorting unit, and a control unit. The conveyance unit conveys articles. The alignment unit collects and aligns a predetermined number of the articles conveyed thereto from the conveyance unit to form an article group. The sorting unit sorts the articles off the conveyance unit before the articles on the conveyance unit reach the alignment unit. The control unit determines whether the articles heading to the alignment unit can be aligned in the alignment unit and, when it determines that the articles cannot be aligned, sorts the articles via the sorting unit.

In the article-transfer apparatus, if the supply intervals of the articles supplied from upstream to the conveyance unit become short, there are cases where the articles may not be able to be aligned by the alignment unit even if they reach the alignment unit from the conveyance unit. In such cases, the aligned orientation of the articles becomes disturbed. Therefore, articles determined to be unable to be aligned by the alignment unit are sorted on the conveyance unit and are not allowed to reach the alignment unit, whereby disturbances in the aligned orientation of the articles are avoided beforehand.

An article-transfer apparatus of a second aspect is the article-transfer apparatus of the first aspect, wherein the alignment unit includes an alignment conveyor. Each time the alignment conveyor receives one of the articles from the conveyance unit, it conveys that article a predetermined distance in one direction, stops, and waits to receive a trailing article.

In this article-transfer apparatus, some time to spare for the alignment conveyor to align the articles can be ensured without the alignment conveyor immediately delivering to the next process the articles it has received from the conveyance unit, so a situation where the next process is pressed to process the articles is inhibited.

An article-transfer apparatus of a third aspect is the article-transfer apparatus of the first aspect or the second aspect, further including a first detection unit. The first detection unit detects supply intervals of the articles supplied to the conveyance unit. When the supply intervals are equal to or less than a first threshold, the control unit sorts the articles off the conveyance unit via the sorting unit.

In this article-transfer apparatus, whether to sort the articles is determined at the stage where the articles are supplied to the conveyance unit, so the articles are reliably sorted before they reach the alignment unit.

An article-transfer apparatus of a fourth aspect is the article-transfer apparatus of the third aspect, further including a second detection unit. The second detection unit detects a queued number of the articles in the alignment unit. A plurality of the article groups can be aligned in the alignment unit. When the queued number of the articles becomes equal to or greater than a second threshold, the control unit sorts the articles off the conveyance unit via the sorting unit regardless of the supply intervals of the articles supplied to the conveyance unit.

In this article-transfer apparatus, even if the supply intervals of the articles supplied to the conveyance unit are appropriate, if the articles exceed an allowable level in the alignment unit there is the risk that this will disturb the alignment of the articles in the alignment unit. In such cases, the articles on the conveyance unit are sorted off the conveyance unit regardless of the supply intervals of the articles supplied to the conveyance unit, whereby hindrances to the alignment of the articles in the alignment unit are avoided.

An article-transfer apparatus of a fifth aspect is the article-transfer apparatus of the fourth aspect, wherein the control unit doubles as the second detection unit. The control unit calculates the queued number of the articles based on the number of alignment operations in the alignment unit.

In this article-transfer apparatus, there is no need to provide a physical sensor, so this contributes to a reduction in apparatus cost.

An article-transfer apparatus of a sixth aspect is the article-transfer apparatus of the fourth aspect, wherein the second detection unit is a camera. The control unit comprehends the queued number of the articles from an image obtained by the camera.

An article-transfer apparatus of a seventh aspect is the article-transfer apparatus of any one of the first aspect to the sixth aspect, wherein the sorting unit includes an air nozzle, an air supply source, and a valve. The air nozzle jets air toward the articles. The air supply source supplies air to the air nozzle. The valve is connected between the air nozzle and the air supply source. The control unit controls the switching on and off of the valve to thereby switch between causing air to be jetted from the air nozzle and stopping air from being jetted from the air nozzle. In this article-transfer apparatus, installation is easy and space is saved.

An article-transfer apparatus of an eighth aspect is the article-transfer apparatus of any one of the first aspect to the sixth aspect, wherein the sorting unit has a swinging member. The swinging member swings between a standby position in which it does not interfere with the articles on the conveyance unit and an operative position in which it hits the articles on the conveyance unit and guides the articles off the conveyance unit.

An article-transfer apparatus of a ninth aspect is the article-transfer apparatus of any one of the first aspect to the eighth aspect, wherein the sorting unit sorts the articles off the conveyance unit in a zone between an upstream end and a middle of the conveyance unit.

In this article-transfer apparatus, in cases where it is determined in a process upstream of the conveyance unit that the articles are rejects, the reject articles are immediately excluded.

An article-transfer apparatus of a tenth aspect is the article-transfer apparatus of any one of the first aspect to the ninth aspect, further including transporting means for transporting the article group to a predetermined position. The predetermined position is movable. Even if an abnormality occurs in the movement of the predetermined position, the conveyance of the articles from the conveyance unit to the alignment unit is continued.

In the article-transfer apparatus of the present disclosure, articles determined to be unable to be aligned by the alignment unit are sorted on the conveyance unit and are not allowed to reach the alignment unit, whereby disturbances in the aligned orientation of the articles are avoided beforehand.

BRIEF DESCRIPTION OF THE DRAWINGS

FIG. 1 is a schematic perspective view showing configurations of an article-transfer apparatus;

FIG. 2 is a control block diagram of the article-transfer apparatus;

FIG. 3 is a perspective view of the article-transfer apparatus in which an infeed conveyor is seen from an alignment conveyor side in a state in which a surface of the infeed conveyor contacting a bag is instantaneously removed;

FIG. 4 is an elevation view of the orientation of a bag when the bag drops from the infeed conveyor in a case where the surface of the infeed conveyor contacting the bag is instantaneously removed;

FIG. 5 is an elevation view of an article-transport unit;

FIG. 6A is a schematic side view of the article-transport unit collectively holding a plurality of bags;

FIG. 6B is a schematic side view of the article-transport unit transporting the plurality of bags to a container;

FIG. 7 is a schematic plan view of an article-conveyance unit and an article-alignment unit;

FIG. 8 is a schematic plan view of the article-conveyance unit and the article-alignment unit when an article-sorting unit is operating;

FIG. 12 is a schematic plan view of the article-conveyance unit and the article-alignment unit in which a swinging arm is disposed as the article-sorting unit; and FIG. 13 is a schematic plan view of the article-conveyance unit and the article-alignment unit when the swinging arm of FIG. 12 is operating.

DETAILED DESCRIPTION

(1) Configurations of Article-Transfer Apparatus 1

Figure 9:
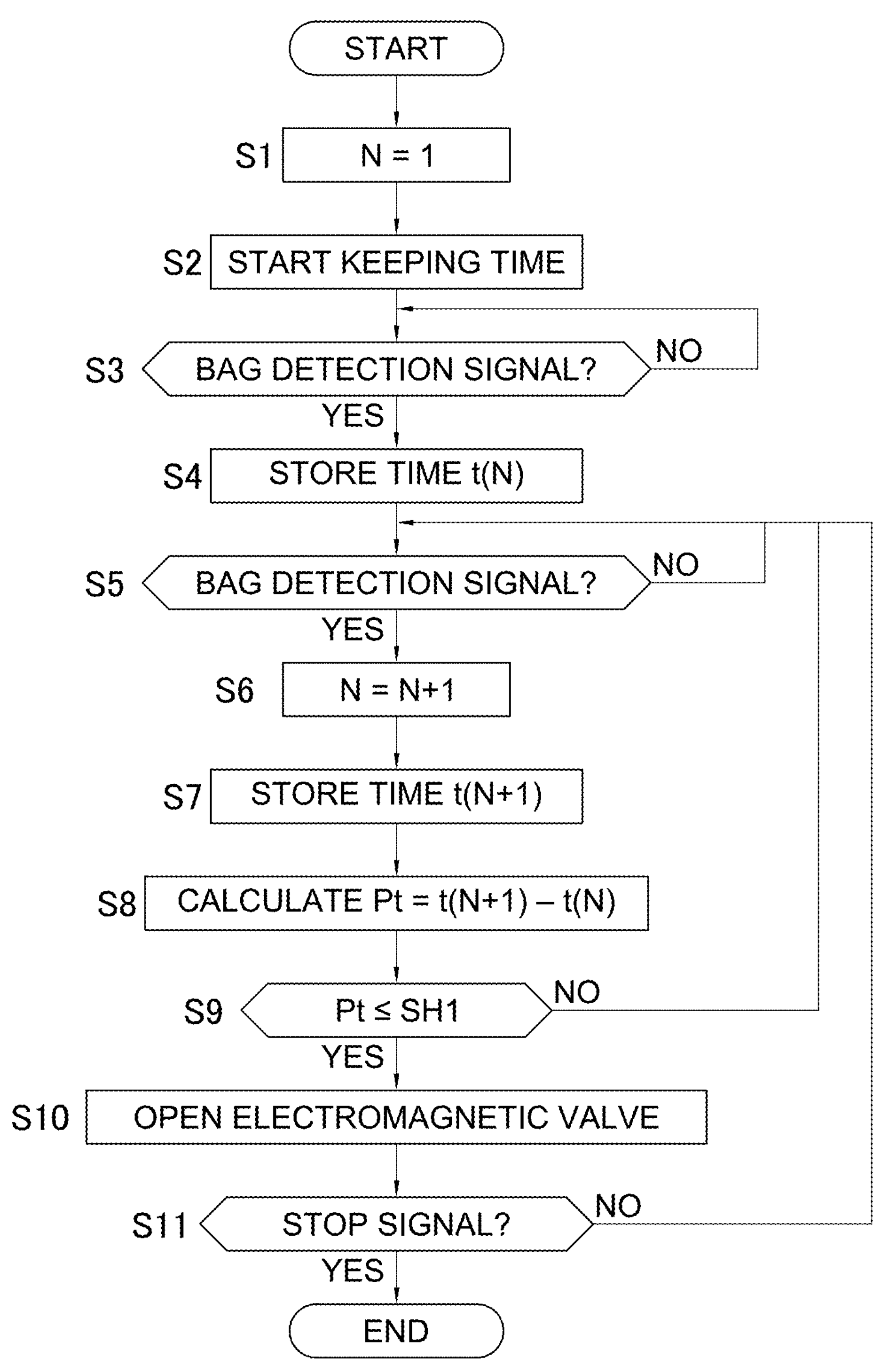
FIG. 9 is a control flowchart of the article-sorting unit.

FIG. 1 is a schematic perspective view showing configurations of an article-transfer apparatus 1. As illustrated in FIG. 1, in a process upstream of the article-transfer apparatus 1 in a flow of bags G, a weighing apparatus and a bagmaking-and-packaging machine (not shown in the drawings) are disposed. To the article-transfer apparatus 1 are supplied only bags G that have passed weight, seal, and contamination inspections in the upstream process.

The article-transfer apparatus 1 includes an article-conveyance unit 10, an article-alignment unit 20, an article-transport unit 30, an article-detection unit 60, and an article-sorting unit 70. The article-conveyance unit 10 receives the bags G and conveys them to the article-alignment unit 20. The article-alignment unit 20 aligns the bags G supplied from the article-conveyance unit 10. The article-transport unit 30 collectively transports to a container 40 a plurality of the bags G aligned by the article-alignment unit 20. The article-sorting unit 70 sorts the bags G off the article-conveyance unit 10 in cases where it has been determined that the bags G heading to the article-alignment unit 20 cannot be aligned in the article-alignment unit 20.

FIG. 2 is a control block diagram of the article-transfer apparatus 1. As illustrated in FIG. 2, a control unit 80 controls operations of drive parts of the article-conveyance unit 10, the article-alignment unit 20, the article-transport unit 30, and the article-sorting unit 70 of the article-transfer apparatus 1. The control unit 80 includes a CPU 81 and a ROM 82 and a RAM 83 that are connected to the CPU 81.

(1-1) Article-Conveyance Unit 10

The article-conveyance unit 10 has an article-introduction conveyor 11, an infeed conveyor 12, a support conveyor 13, and an orientation-changing conveyor 14.

(1-1-1) Article-Introduction Conveyor 11

The article-introduction conveyor 11 receives a supply of the bags G that have passed the weight, seal, and contamination inspections and guides the bags G to the infeed conveyor 12.

(1-1-2) Infeed Conveyor 12

The infeed conveyor 12 conveys the bags G conveyed thereto from the article-introduction conveyor 11 to the article-alignment unit 20.

Furthermore, as shown in FIG. 1, the conveyance surface of the infeed conveyor 12 is inclined in a clockwise direction when its downstream side is seen from its upstream side in the conveyance direction of the bags G.

Specifically, the orientation of each of the bags G, when switching from the infeed conveyor 12 to an alignment conveyor 21, is inclined in such a way that the part of the bag G that lands on the bag G already placed on the alignment conveyor 21 is up and the part of the bag G that lands directly on the alignment conveyor 21 is down.

The infeed conveyor 12 is extensible and retractable. In the present embodiment, when the bags G reach the leading end portion of the infeed conveyor 12, the surface of the infeed conveyor 12 contacting the bags G is instantaneously removed. FIG. 3 is a perspective view of the article-transfer apparatus 1 in which the infeed conveyor 12 is seen from the alignment conveyor 21 side in a state in which the surface of the infeed conveyor 12 contacting a bag G is instantaneously removed. Furthermore, FIG. 4 is a front elevation view of the orientation of a bag G when the bag G drops from the infeed conveyor 12 in a case where the surface of the infeed conveyor 12 contacting the bag G is instantaneously removed.

As illustrated in FIG. 3 and FIG. 4, when a bag G is conveyed to the downstream side of the infeed conveyor 12 and a position sensor 15 detects that the leading end portion of the bag G has reached the leading end portion of the infeed conveyor 12, a leading end portion roller R1 of the infeed conveyor 12 moves a distance D1 in a direction X2 opposite the conveyance direction (a first direction X1). At this time, an intermediate roller R2 of the infeed conveyor 12 also moves the distance D1 in the direction X2 in conjunction therewith, thereby absorbing slack in the conveyor belt when the leading end portion roller R1 moves in the direction X2.

Because the leading end portion of the infeed conveyor 12 instantaneously moves to the upstream side of the bag G, the bag G suddenly loses the drag from the conveyance surface of the infeed conveyor 12 but due to inertia maintains the orientation that it had while it was being conveyed.

Therefore, the bag G easily maintains its orientation when it leaves the infeed conveyor 12, and a disturbance in orientation when the bag G lands on the alignment conveyor 21 is inhibited.

(1-1-3) Support Conveyor 13

The support conveyor 13 is disposed on the lower end portion in the direction of inclination of the infeed conveyor 12. The conveyance surface of the support conveyor 13 and the conveyance surface of the infeed conveyor 12 are orthogonal to each other. The bags G moving on the conveyance surface of the infeed conveyor 12 are subjected to a component of the force of gravity along the direction of inclination, so they move while sliding downward toward the support conveyor 13 and thereafter move along the support conveyor 13. The conveyance surface of the support conveyor 13 moves along the advancing direction of the conveyance surface of the infeed conveyor 12 so as to not hinder the conveyance of the bags G.

(1-1-4) Orientation-Changing Conveyor 14

The orientation-changing conveyor 14 is disposed on the upper end portion in the direction of inclination of the infeed conveyor 12. The orientation-changing conveyor 14 is disposed in such a way as to oppose the support conveyor 13 on the conveyance surface of the infeed conveyor 12. When the orientation-changing conveyor 14 is seen using the conveyance surface of the infeed conveyor 12 as a front elevation, the downstream end of the orientation-changing conveyor 14 in the conveyance direction is in a position nearer to the support conveyor 13 than the upstream end.

When the corners of the bags G contact the orientation-changing conveyor 14, the bags G rotate in a counterclockwise direction about the point of contact and the orientation of the bags G changes so that long sides of the bags G are oriented obliquely downward along the orientation-changing conveyor 14. Thereafter, the bags G hit the support conveyor 13, changing orientation so that the long sides of the bags G are along the support conveyor 13, and head to the alignment conveyor 21.

(1-2) Article-Alignment Unit 20

The article-alignment unit 20 has the alignment conveyor 21, an outfeed conveyor 22, and a rotation prevention conveyor 23.

(1-2-1) Alignment Conveyor 21 and Outfeed Conveyor 22

The alignment conveyor 21 and the infeed conveyor 12 are arranged in such a way that their conveyance surfaces are orthogonal to each other. Each time the alignment conveyor 21 catches one bag G, it conveys that bag G a fixed distance toward the outfeed conveyor 22.

Therefore, the bag G moves the fixed distance closer to the outfeed conveyor 22 from the position where it dropped. A part of the bag G that comes dropping thereafter lands on the alignment conveyor 21 while the remaining part inclines against the preceding bag G. Therefore, the bags G on the alignment conveyor 21 form a line in such a way that mutually adjacent bags partially lie on top of each other.

After the bag G at the rear of the line lands on the alignment conveyor 21, the alignment conveyor 21 and the outfeed conveyor 22 simultaneously start operating, and the alignment conveyor 21 and the outfeed conveyor 22 perform a conveyance operation in the same direction. N-number of the bags G aligned in a line on the alignment conveyor 21 move as one article group to the outfeed conveyor 22, and the article group that was already on the outfeed conveyor 22 further advances on the outfeed conveyor 22.

(1-2-2) Rotation-Prevention Conveyor 23

The rotation-prevention conveyor 23 is disposed in a substantially vertical orientation so as to oppose the terminal end of the infeed conveyor 12. Specifically, the rotation-prevention conveyor 23 is disposed along the side surface of the alignment conveyor 21 positioned on the far side from the terminal end of the infeed conveyor 12 among the two side surfaces of the alignment conveyor 21.

The bags G that have lost the drag from the infeed conveyor 12 are given a velocity component in the first direction X1 as shown in FIG. 4, so they drop while moving closer to the side surface of the alignment conveyor 21 on the far side from the terminal end of the infeed conveyor 12 among the two side surfaces of the alignment conveyor 21.

When the bags G land on the alignment conveyor 21, they land in such a way that short sides of the bags G hit the rotation-prevention conveyor 23 and those short sides are substantially along the conveyance surface of the rotation prevention conveyor 23.

The conveyance surface of the rotation-prevention conveyor 23 advances synchronously with the alignment conveyor 21 at the same speed as the conveyance surface of the alignment conveyor 21 in a second direction Y that is the conveyance direction of the alignment conveyor 21. Therefore, the short sides of the bags G contacting the conveyance surface of the rotation-prevention conveyor 23 and the short sides of the bags G not contacting the conveyance surface of the rotation-prevention conveyor 23 advance at the same speed, so rotation of the bags G is avoided.

Consequently, the rotation-prevention conveyor 23 prevents rotation of the bags G and does not just merely guide the bags G so that the short sides of the bags G are along the second direction Y.

(1-3) Article-Transport Unit 30

The article-transport unit 30 is a parallel link robot having three sets of links. The article-transport unit 30 picks up the article group of the bags G that have been conveyed thereto on the outfeed conveyor 22 and moves in a horizontal direction to the area over a container 40. When the article-transport unit 30 reaches the area over the container, it transfers the article group to the inside of the container 40.

FIG. 5 is a front elevation view of the article-transport unit 30. As illustrated in FIG. 5, the article-transport unit 30 includes a base 32, three servomotors **33*a*, 33*b*, 33*c*, parallel link arms 34*a*, 34*b*, 34*c*, and a suction holder 38. The article-transport unit 30** is a robot configured by these.

(1-3-1) Base 32

As shown in FIG. 5, the base 32 is positioned over the outfeed conveyor 22 or the container 40 (see FIG. 3). The base 32 holds under it the three servomotors **33*a*, 33*b*, 33*c*** at equal distances from each other.

(1-3-2) Parallel Link Arms **34*a*, 34*b*, 34*c***

Upper ends of the parallel link arms **34*a*, 34*b*, 34*c* are coupled to output shafts of the servomotors 33*a*, 33*b*, 33*c*, and lower ends are coupled to the suction holder 38**.

During operation of the article-transport unit 30, the amounts of rotation and the directions of rotation of the output shafts of the servomotors **33*a*, 33*b*, 33*c* are appropriately controlled so that the lower ends of the parallel link arms 34*a*, 34*b*, 34*c* move in the horizontal direction and the vertical direction and the suction holder 38** moves to arbitrary positions in a fixed three-dimensional space.

(1-3-3) Suction Holder 38

The suction holder 38 has a plurality of suction pads 38*a* on its lower portion. The suction pads 38*a* are connected to a suction tube 36 extending from a vacuum pump or a vacuum blower (not shown in the drawings) and switch between a state in which they suck and hold the bags G and a state in which suction is canceled. Due to the suction of the article groups by the suction pads 38*a* and the cancelation of the suction, the suction holder 38 can both grab hold of and release the article groups.

Specifically, as shown in FIG. 5, the suction holder 38 collectively grabs hold of a bag G1, a bag G2, and a bag G3 on the outfeed conveyor 22, the parallel link arms 34*a*, 34*b*, 34*c* raise and move the suction holder 38 within a plane, and the suction by the suction holder 38 is canceled over the container 40. Because of this, the bag G1, the bag G2, and the bag G3 disengage from the suction holder 38 and are transferred into the container.

While the bag G1, the bag G2, and the bag G3, which are a first article group, are being transported, a bag G4, a bag G5, and a bag G6, which are a subsequent second article group, are already standing by on the alignment conveyor 21. A gap along the conveyance direction is ensured between the first article group and the second article group, so when the article-transport unit 30 transports the first article group, the bag G4, the bag G5, and the bag G6 of the second article group are kept from being sucked by the suction holder 38.

FIG. 6A is a schematic side view of the article-transport unit 30 collectively holding a plurality of bags G. Furthermore, FIG. 6B is a schematic side view of the article-transport unit 30 transporting the plurality of bags G to a container 40.

As illustrated in FIG. 6A and FIG. 6B, the suction holder 38 of the article-transport unit 30 collectively sucks the plurality of bags G in the article group moving thereto on the outfeed conveyor 22, transports them to the container 40, and transfers them into the container 40. The container 40 is moved to a subsequent position by a container conveyor 50 each time an article group is dropped.

(1-4) Article-Detection Unit 60

The article-detection unit 60 includes a first detection unit 61 and a second detection unit 62. The first detection unit 61 detects the bags G passing over the article-introduction conveyor 11 of the article-conveyance unit 10. The second detection unit 62 detects the quantity of the bags G waiting on the alignment conveyor 21 and the outfeed conveyor 22. Here, the control unit 80 doubles as the second detection unit 62.

(1-4-1) First Detection Unit 61

FIG. 7 is a schematic plan view of the article-conveyance unit 10 and the article-alignment unit 20. As illustrated in FIG. 7, the first detection unit 61 is a photoelectric sensor having a light emitting unit 61*a* and a light receiving unit 61*b*. The first detection unit 61 is disposed in a position in which it can detect the bags G advancing past the entrance of the article-introduction conveyor 11.

Furthermore, as shown in FIG. 2, the first detection unit 61 (the light-emitting unit 61*a* and the light-receiving unit 61*b*) are connected to the control unit 80. The signal voltage input to the control unit 80 when the light-receiving unit 61*b* is receiving the light from the light-emitting unit 61*a* and the signal voltage input to the control unit 80 when the light-receiving unit 61*b* is not receiving the light from the light-emitting unit 61*a* are different. When the bags G pass between the light-emitting unit 61*a* and the light-receiving unit 61*b*, the light from the light-emitting unit 61*a* is blocked, so the light-receiving unit 61*b* cannot receive the light and the signal voltage input to the control unit 80 changes. This allows the passage of the bags G to be detected.

(1-4-2) Second Detection Unit 62

Regarding the control by the control unit 80, each time the alignment conveyor 21 catches one bag G, it conveys that bag G a fixed distance toward the outfeed conveyor 22. Then, when an article group comprising a predetermined number of the bags G is formed on the alignment conveyor 21, the alignment conveyor 21 conveys the article group onto the outfeed conveyor 22.

The control unit 80 successively measures, from this series of operations, the quantity of the bags G waiting on the alignment conveyor 21 and the outfeed conveyor 22 (hereinafter called a queued number F). Here, although the control unit 80 doubles as the second detection unit 62, the second detection unit 62 is not limited to this, and a sensor may be separately provided as the second detection unit 62.

(1-5) Article-Sorting Unit 70

FIG. 8 is a schematic plan view of the article-conveyance unit 10 and the article-alignment unit 20 when the article-sorting unit 70 is operating. As illustrated in FIG. 8, the article-sorting unit 70 has an air nozzle 71, an air supply source 72, and an electromagnetic valve 73.

The air nozzle 71 can jet air toward the bags G. The air supply source 72 supplies air to the air nozzle. The electromagnetic valve 73 is connected between the air nozzle 71 and the air supply source 72.

The control unit 80 controls the switching on and off of the electromagnetic valve 73 to thereby switch between causing air to be jetted from the air nozzle 71 and stopping air from being jetted from the air nozzle 71.

As shown in FIG. 7, the control unit 80 measures, based on the input signals from the first detection unit 61, a time interval Pt from when an Nth bag G is detected to when an (N+1)th bag G is detected. Furthermore, the control unit 80 calculates the relative distance between the Nth bag G and the (N+1)th bag G based on the conveyance speeds of the article-introduction conveyor 11 and the infeed conveyor 12 and the time interval Pt.

Consequently, the shorter the time interval Pt is, the shorter the relative distance between the Nth bag G and the (N+1)th bag G is. If the relative distance between the Nth bag G and the (N+1)th bag G is too short, there is the risk that the (N+1)th bag G will reach the alignment conveyor 21 before the Nth bag G is completely aligned on the alignment conveyor 21 and disturb the alignment of the bags G.

Thus, in the present embodiment, when the time interval Pt is equal to or less than a first threshold SH1, it is judged that the trailing (N+1)th bag G is too close to the preceding Nth bag G and that the alignment of the Nth bag G on the alignment conveyor 21 will be hindered.

Therefore, before the (N+1)th bag G on the article-introduction conveyor 11 moves to the infeed conveyor 12, the control unit 80 causes air to be jetted from the air nozzle 71 toward the (N+1)th bag G to thereby sort the (N+1)th bag G off the article-introduction conveyor 11.

As shown in FIG. 8, the air nozzle 71 can sort the bags G off the article-conveyance unit 10 in the zone of the article-introduction conveyor 11. Therefore, reject articles are immediately excluded not only in cases where the alignment of a preceding bag G will be hindered but also in cases where the bags G are determined to be rejects in the process upstream of the article-introduction conveyor 11.

(2) Operations of Article-Transfer Apparatus 1

Here, operations will be described supposing a state in which the bag G1, the bag G2, and the bag G3 that have passed the inspections have been introduced from upstream at appropriate supply intervals to the article-introduction conveyor 11 and are being sequentially supplied to the infeed conveyor 12. Consequently, the operation of the article-sorting unit 70 will not be described here but will be described further below.

The infeed conveyor 12 conveys toward the alignment conveyor 21 the bag G1 supplied from the article-introduction conveyor 11. When the leading end portion of the bag G1 reaches the leading end portion of the infeed conveyor 12, the leading end portion of the infeed conveyor 12 instantaneously moves the distance D1 in the direction X2 opposite the first direction X1 as shown in FIG. 4.

The bag G1 lands on the alignment conveyor 21 while maintaining the orientation it had just before the surface of the infeed conveyor 12 contacting the bag G1 was removed. When there is no preceding bag on the alignment conveyor 21, the bag G1 becomes the front of the line on the alignment conveyor 21. For convenience of description, the bag G1 will be described as the front of the line.

When the alignment conveyor 21 catches the bag G1, it conveys the bag G1 the fixed distance toward the outfeed conveyor 22 and waits to receive the trailing bag G2.

Next, when the leading end portion of the bag G2 reaches the leading end portion of the infeed conveyor 12, the surface of the infeed conveyor 12 contacting the bag G2 is instantaneously removed and the bag G2 also lands on the alignment conveyor 21 while maintaining the orientation it has at that time.

The infeed conveyor 12 is inclined in such a way that the part of the bag G2 that lands on the bag G1 already placed on the alignment conveyor 21 is up and the part of the bag G2 that lands directly on the alignment conveyor 21 is down, so the bag G2 drops while maintaining its inclined orientation, a part of the bag G2 lands on the bag G1, and the remaining part of the bag G2 lands on the alignment conveyor 21.

When the alignment conveyor 21 catches the bag G2, it conveys the bag G1 and the bag G2 the fixed distance toward the outfeed conveyor 22 and waits to receive the trailing bag G3.

Next, when the leading end portion of the bag G3 reaches the leading end portion of the infeed conveyor 12, the surface of the infeed conveyor 12 contacting the bag G3 is instantaneously removed and the bag G3 also lands on the alignment conveyor 21 while maintaining the orientation it has at that time. A part of the bag G3 lands on the bag G2 while the remaining part lands on the alignment conveyor 21.

The bag G1, the bag G2, and the bag G3 on the alignment conveyor 21 form a line in which mutually adjacent bags partially lie on top of each other. When the line of the bag G1, the bag G2, and the bag G3 is finished, the alignment conveyor 21 conveys the line as one article group to the outfeed conveyor 22. At this time, the outfeed conveyor 22 also operates in the same direction, so the article group on the alignment conveyor 21 moves onto the outfeed conveyor 22. If there is a preceding article group on the outfeed conveyor 22, that article group moves further downstream.

As shown in FIG. 6A and FIG. 6B, the suction holder 38 of the article-transport unit 30 collectively sucks the plurality of bags G in the article group moving thereto on the outfeed conveyor 22, transports them to the container 40, and transfers them into the container 40. The container 40 is moved to a subsequent position by the container conveyor 50 each time an article group is dropped.

The article-transfer apparatus 1 repeats the above operations to pack the necessary bags G in the container 40.

Furthermore, even if an abnormality occurs in the movement of the container 40 by the container conveyor 50, the conveyance of the bags G from the article-conveyance unit 10 to the article-alignment unit 20 is continued.

(3) Control of Article-Sorting Unit 70

Here, the operation of the article-sorting unit 70 will be described supposing a case where the supply intervals of the bags G supplied to the article-introduction conveyor 11 are not stable. FIG. 9 is a control flowchart of the article-sorting unit 70.

(Step S1)

In step S1 of FIG. 9, the control unit 80 resets a counter to N=1.

(Step S2)

In step S2, the control unit 80 starts keeping time.

(Step S3)

In step S3, the control unit 80 determines whether there is a bag detection signal indicating that a bag G has been detected. The control unit 80 proceeds to step S4 when there is a bag detection signal and continues determining whether there is a bag detection signal when there is not a bag detection signal.

(Step S4)

In step S4, the control unit 80 stores the time when the bag G was detected in step S3 as a time t(N) when the Nth bag G was detected.

(Step S5)

In step S5, the control unit 80 determines whether there is a bag-detection signal indicating that a bag G has been detected. The control unit 80 proceeds to step S6 when there is a bag-detection signal and continues determining whether there is a bag-detection signal when there is not a bag-detection signal.

(Step S6)

In step S6, the control unit 80 adds 1 to the counter.

(Step S7)

In step S7, the control unit 80 stores the time when the bag G was detected in step S5 as a time t(N+1) when the (N+1)th bag G was detected.

(Step S8)

In step S8, the control unit 80 calculates the time interval Pt=t(N+1)−t(N).

(Step S9)

In step S9, the control unit 80 determines whether the time interval Pt is equal to or less than the first threshold SH1. When Pt≤SH1, the (N+1)th bag G is too close to the Nth bag G. Therefore, there is the risk that as the Nth bag G is being aligned on the alignment conveyor 21 the (N+1)th bag G will reach the alignment conveyor 21 and hinder the alignment of the Nth bag G.

When Pt≤SH1, the control unit 80 proceeds to step S10 and needs to exclude the (N+1)th bag G before it reaches the alignment conveyor 21. When Pt is not ≤SH1, the control unit 80 returns to step S5.

(Step S10)

In step S10, the control unit 80 opens the electromagnetic valve 73 of the article-sorting unit 70 to jet air from the nozzle 71 toward the (N+1)th bag G on the article-introduction conveyor 11. Because of this, the (N+1)th bag G is sorted off the article-introduction conveyor 11.

(Step S11)

In step S11, the control unit 80 determines whether there is a signal to stop the article-transfer apparatus 1. The control unit 80 ends the control when there is a stop signal and returns to step S5 when there is not a stop signal.

As described above, in the present embodiment, in cases where the supply intervals of the bags G supplied to the article-introduction conveyor 11 are unstable and there is the risk that the intervals between the bags G are narrow and will hinder the alignment of the bags G, the article-sorting unit 70 can exclude the bags G that risk hindering alignment.

(4) Example Modification

Figure 10:
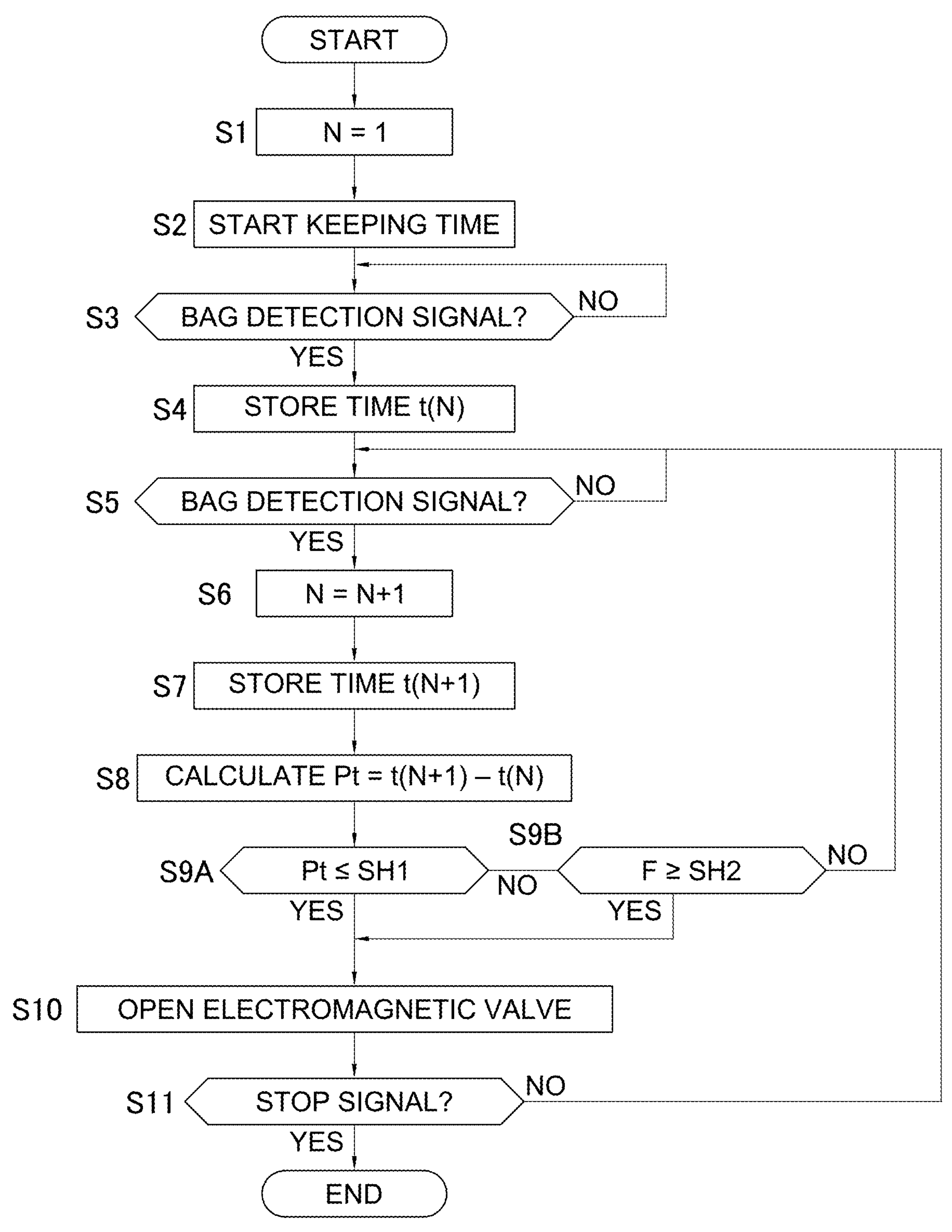
FIG. 10 is a control flowchart of the article-sorting unit of the article-transfer apparatus pertaining to an exemplary modification.

FIG. 10 is a control flowchart of the article-sorting unit 70 of the article-transfer apparatus 1 pertaining to an example modification. What is different from the control flowchart of FIG. 9 is that step S9 is changed to step S9A and a new step S9B is added.

As illustrated in FIG. 10, steps S1 to S8, S10, and S11 are the same as those in the above embodiment, so description thereof is omitted.

(Step S9A)

In step S9A, the control unit 80 determines whether the time interval Pt is equal to or less than the first threshold SH1. When Pt≤SH1, the (N+1)th bag G is too close to the Nth bag G. Therefore, there is the risk that as the Nth bag G is being aligned on the alignment conveyor 21 the (N+1)th bag G will reach the alignment conveyor 21 and hinder the alignment of the Nth bag G.

Therefore, when Pt≤SH1, the control unit 80 proceeds to step S10 and needs to exclude the (N+1)th bag G before it reaches the alignment conveyor 21. When Pt is not ≤SH1, the control unit 80 proceeds to step S9B.

(Step S9B)

In step S9B, the control unit 80 determines whether the queued number F, which is the quantity of the bags G waiting on the alignment conveyor 21 and the outfeed conveyor 22, is equal to or greater than a second threshold SH2. When F≥SH2, even if the interval between the (N+1)th bag G and the Nth bag G is proper, the bags G are stalled on the alignment conveyor 21 and the outfeed conveyor 22, so it is best not to convey the bags G to the alignment conveyor 21.

Therefore, when F≥SH2, the control unit 80 proceeds to step S10 and needs to exclude the (N+1)th bag G before it reaches the alignment conveyor 21. When F is not ≥SH2, the control unit 80 returns to step S5.

As described above, in the present exemplary modification, even if the supply intervals of the bags G supplied to the article-introduction conveyor 11 are stable, in cases where there is the risk that the bags G are stalled on the alignment conveyor 21 and the outfeed conveyor 22 and the alignment of the bags G will be hindered, the article-sorting unit 70 excludes the bags G that risk hindering alignment.

(5) Summary of Features

In the article-transfer apparatus 1, in cases where the time intervals Pt of the bags G supplied from upstream to the article-introduction conveyor 11 become short and the control unit 80 judges that the bags G will not be able to be aligned even if they reach the alignment conveyor 21, the air nozzle 71 of the article-sorting unit 70 sorts the bags G off the article-introduction conveyor 11.

Each time the alignment conveyor 21 receives one of the bags G from the infeed conveyor 12, it conveys that bag G a predetermined distance in one direction, stops, and waits to receive a trailing bag G. Some time to spare for the alignment conveyor 21 to align the bags G can be ensured without the alignment conveyor 21 immediately delivering to the next process the bags G it has received from the infeed conveyor 12, so a situation where the next process is pressed to process the bags G is inhibited.

The control unit 80 measures via the first detection unit 61 the time intervals Pt that are supply intervals of the bags G supplied to the article-introduction conveyor 11. When the time intervals Pt are equal to or less than the first threshold SH1, the control unit 80 sorts the bags G off the article-introduction conveyor 11 via the article-sorting unit 70. Whether to sort the bags G is determined at the stage where the bags G are supplied to the article-introduction conveyor 11, so the bags G are reliably sorted before they reach the alignment conveyor 21.

The second detection unit 62 detects the queued number of the bags G on the alignment conveyor 21 and the outfeed conveyor 22. When the queued number of the bags G is equal to or greater than the second threshold SH2, the control unit 80 sorts the bags G off the article-introduction conveyor 11 via the article-sorting unit 70 regardless of the time intervals Pt.

Even if the time intervals Pt that are supply intervals of the bags G supplied to the article-introduction conveyor 11 are appropriate, if the queued number F of the bags G on the alignment conveyor 21 and the outfeed conveyor 22 exceeds an allowable level there is the risk that this will disturb the alignment of the bags G on the alignment conveyor 21 and the outfeed conveyor 22. In such cases, the bags G are sorted off the article-introduction conveyor 11 regardless of the supply intervals of the bags G supplied to the article-introduction conveyor 11, whereby hindrances to the alignment of the bags G on the alignment conveyor 21 are avoided.

The control unit 80 doubles as the second detection unit 62. The control unit 80 calculates the queued number F of the articles based on the number of alignment operations in the alignment conveyor 21 and the outfeed conveyor 22.

The article-sorting unit 70 includes the air nozzle 71, the air supply source 72, and the electromagnetic valve 73. The control unit 80 controls the switching on and off of the electromagnetic valve 73 to thereby switch between causing air to be jetted from the air nozzle 71 and stopping air from being jetted from the air nozzle 71.

The air nozzle 71 can sort the bags G off the article-conveyance unit 10 in the zone of the article-introduction conveyor 11. In cases where it is determined in a process upstream of the article-introduction conveyor 11 that the bags G are rejects, the reject articles are immediately excluded.

Even if an abnormality occurs in the movement of the container 40, the conveyance of the bags G from the article-conveyance unit 10 to the article-alignment unit 20 is continued.

(6) Other Exemplary Modifications

In the above embodiment, the control unit 80 doubles as the second detection unit 62 and the air nozzle 71 is employed for the article-sorting unit 70. However, the disclosure is not limited to this, and the second detection unit 62 may be a camera. Furthermore, the article-sorting unit 70 may be a swinging arm that swings between a standby position and an operative position.

Figure 11:
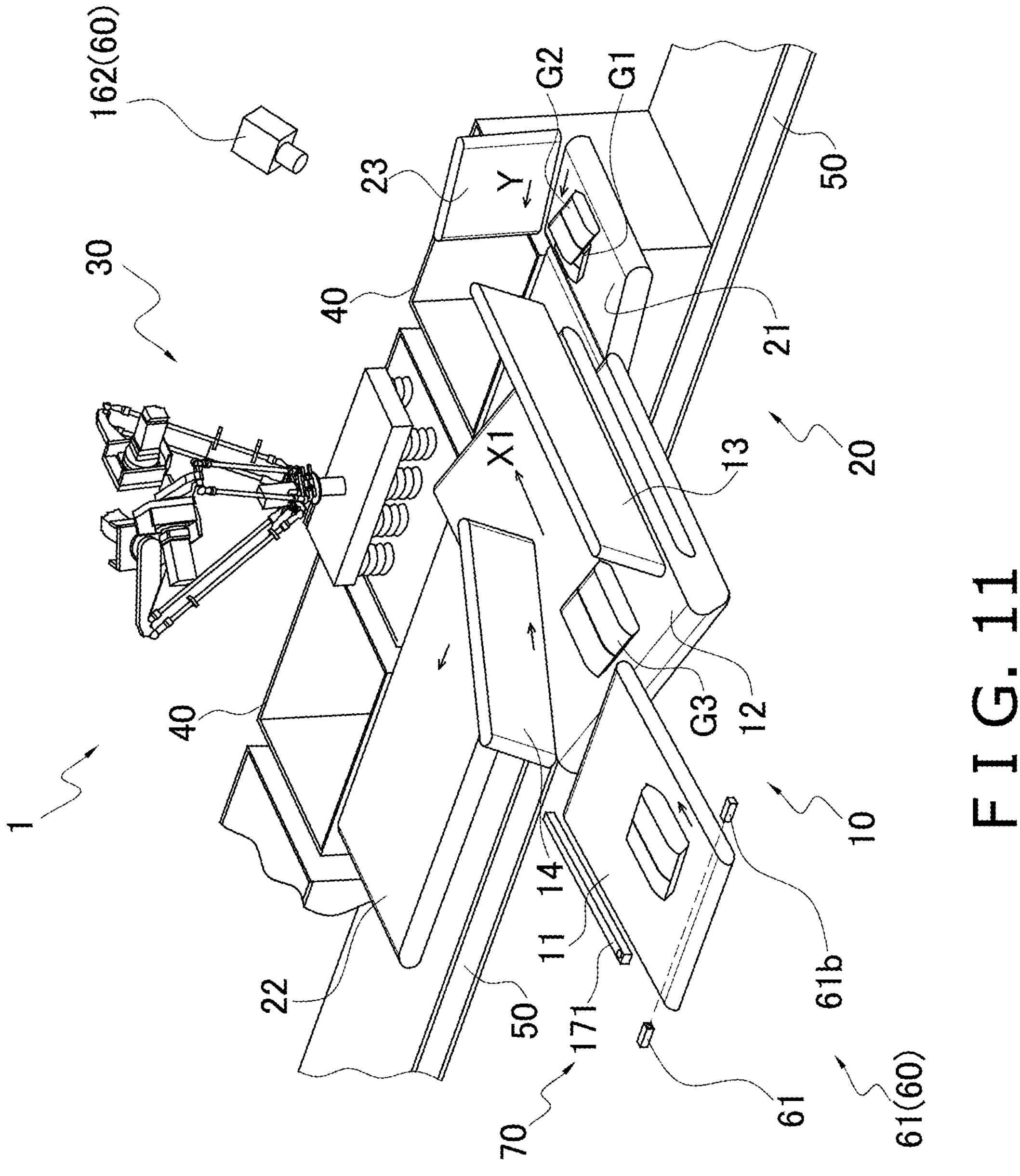
FIG. 11 is a perspective view of the article-transfer apparatus pertaining to another exemplary modification.

FIG. 11 is a perspective view of the article-transfer apparatus 1 pertaining to another exemplary modification. As illustrated in FIG. 11, a camera 162 is employed as the second detection unit 62, and a swinging arm 171 is employed as the article-sorting unit 70.

(6-1)

The control unit 80 determines the queued number F of the bags G on the alignment conveyor 21 and the outfeed conveyor 22 from an image obtained by the camera 162.

In step S9B of FIG. 10, the control unit 80 determines whether the queued number F is equal to or greater than the second threshold SH2. When F≥SH2, even if the interval between the (N+1)th bag G and the Nth bag G is proper, the bags G are stalled on the alignment conveyor 21 and the outfeed conveyor 22, so it is best not to convey the bags G to the alignment conveyor 21.

Therefore, when F≥SH2, the control unit 80 proceeds to step S10 of FIG. 10 and needs to exclude the (N+1)th bag G before it reaches the alignment conveyor 21. When F is not ≥SH2, the control unit 80 returns to step S5 of FIG. 10.

As described above, the camera 162 is also useful as the second detection unit 62.

(6-2)

FIG. 12 is a schematic plan view of the article-conveyance unit 10 and the article-alignment unit 20 in which the swinging arm 171 is disposed as the article-sorting unit 70. As illustrated in FIG. 12, the article-sorting unit 70 has the swinging arm 171. For the actuator that causes the swinging arm 171 to swing, a motor or an air cylinder is employed.

FIG. 13 is a schematic plan view of the article-conveyance unit 10 and the article-alignment unit 20 when the swinging arm 171 of FIG. 12 is operating. As illustrated in FIG. 13, the swinging arm 171 swings from a standby position (FIG. 12) in which it does not interfere with the bags G on the article-introduction conveyor 11 to an operative position in which it hits the bags G on the article-introduction conveyor 11 and guides the bags G off the article-introduction conveyor 11.

As described above, the swinging arm 171 is also useful as the article-sorting unit 70.

REFERENCE SIGNS LIST

1 Article-transfer apparatus
10 Article-conveyance Unit (Conveyance Unit)
11 Article-introduction Conveyor (Conveyance Unit)
12 Infeed Conveyor (Conveyance Unit)
20 Article-alignment Unit (Alignment Unit)
21 Alignment Conveyor (Alignment Unit)
30 Article-transport Unit (Transporting Means)
40 Container (Predetermined Position)
61 First Detection Unit
62 Second Detection Unit
70 Article-sorting Unit (Sorting Unit)
71 Air Nozzle
72 Air Supply Source
73 Electromagnetic Valve (Valve)
80 Control Unit
162 Camera (Second Detection Unit)
171 Swinging Arm (Swinging Member)
G Bags
G1, G2, G3 First Article Group (Article Group)
G4, G5, G6 Second Article Group (Article Group)

CITATION LIST

Patent Literature

Patent Document 1: JP-A No. 2018-154468

What is claimed is:

1. An article-transfer apparatus, comprising:
a conveyance unit that conveys articles;
an alignment unit that collects and aligns a predetermined number of the articles conveyed thereto from the conveyance unit to form an article group;
a sorting unit that sorts the articles off the conveyance unit before the articles on the conveyance unit reach the alignment unit; and
a control unit that determines whether the articles heading to the alignment unit can be aligned in the alignment unit and, when the control unit determines that the articles cannot be aligned, causes the articles to be sorted via the sorting unit,
wherein the alignment unit includes an alignment conveyor which, each time it receives one of the articles from the conveyance unit, conveys the received article a predetermined distance in one direction, stops, and waits to receive a trailing article, such that mutually adjacent bags partially lie on top of each other.

2. The article-transfer apparatus of claim 1, further comprising a first detection unit that detects supply intervals of the articles supplied to the conveyance unit, wherein when the supply intervals are equal to or less than a first threshold, the control unit causes the articles to be sorted off the conveyance unit via the sorting unit.

3. An article-transfer apparatus comprising:
a conveyance unit that conveys articles;
an alignment unit that collects and aligns a predetermined number of the articles conveyed thereto from the conveyance unit to form an article group;
a sorting unit that sorts the articles off the conveyance unit before the articles on the conveyance unit reach the alignment unit;
a control unit that determines whether the articles heading to the alignment unit can be aligned in the alignment unit and, when the control unit determines that the articles cannot be aligned, causes the articles to be sorted via the sorting unit; and
a second detection unit that detects a queued number of the articles in the alignment unit, wherein
a plurality of the article groups can be aligned in the alignment unit, and
when the queued number of the articles becomes equal to or greater than a second threshold, the control unit causes the articles to be sorted off the conveyance unit via the sorting unit regardless of the supply intervals of the articles supplied to the conveyance unit.

4. The article-transfer apparatus of claim 3, wherein
the control unit doubles as the second detection unit, and
the control unit calculates the queued number of the articles based on the number of alignment operations in the alignment unit.

5. The article-transfer apparatus of claim 3, wherein
the second detection unit is a camera, and
the control unit determines the queued number of the articles from an image obtained by the camera.

6. The article-transfer apparatus of claim 1, wherein
the sorting unit includes an air nozzle that jets air toward the articles, an air supply source that supplies air to the air nozzle, and a valve that is connected between the air nozzle and the air supply source, and the control unit controls the switching on and off of the valve to thereby switch between causing air to be jetted from the air nozzle and stopping air from being jetted from the air nozzle.

7. The article-transfer apparatus of claim 1, wherein the sorting unit has a swinging member that swings between a standby position in which it does not interfere with the articles on the conveyance unit and an operative position in which it hits the articles on the conveyance unit and guides the articles off the conveyance unit.

8. The article-transfer apparatus of claim 1, wherein the sorting unit sorts the articles off the conveyance unit in a zone between an upstream end and a middle of the conveyance unit.

9. The article-transfer apparatus of claim 1, further comprising transporting means for transporting the article group to a predetermined position, wherein the predetermined position is movable, and even if an abnormality occurs in the movement of the predetermined position, the conveyance of the articles from the conveyance unit to the alignment unit is continued.

* * * * *